June 5, 1928.
L. S. QUATES
1,672,731
AIR BRAKE SYSTEM AND AUTOMATIC RELEASING VALVE THEREFOR
Filed June 28, 1927  3 Sheets-Sheet 1
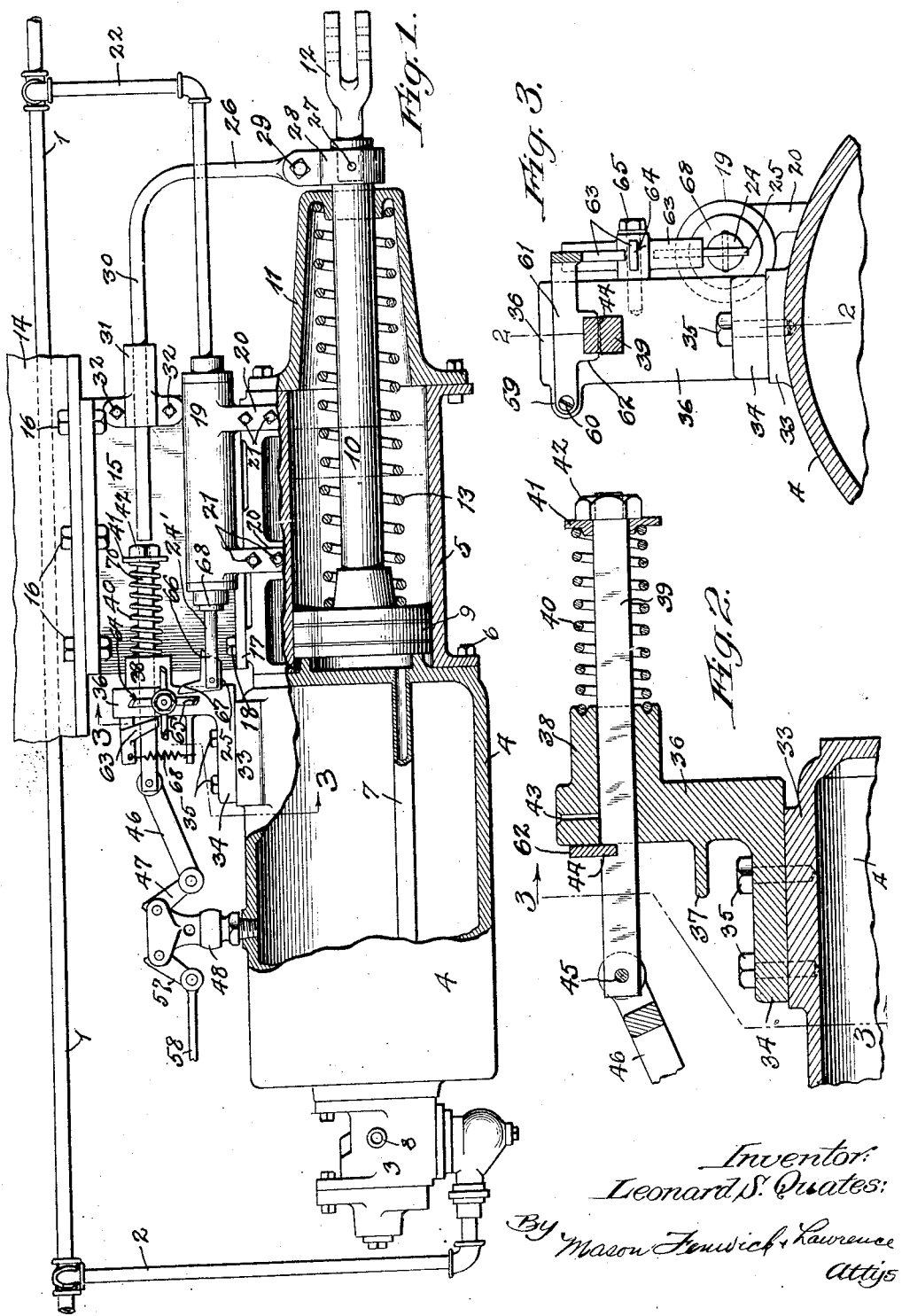
Inventor:
Leonard S. Quates:
By Mason Fenwick + Lawrence
Attys

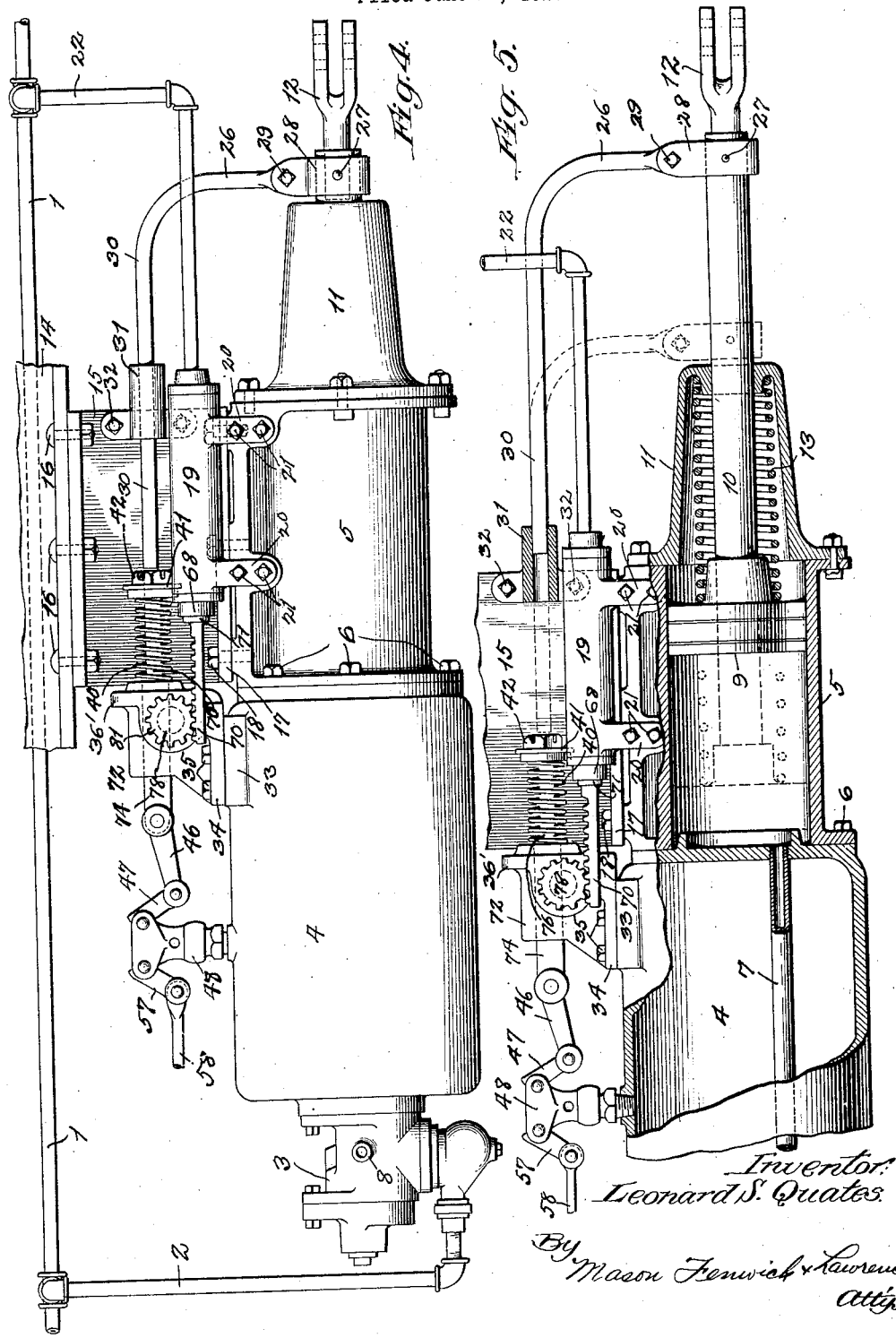

June 5, 1928.
L. S. QUATES
1,672,731
AIR BRAKE SYSTEM AND AUTOMATIC RELEASING VALVE THEREFOR
Filed June 28, 1927     3 Sheets-Sheet 3
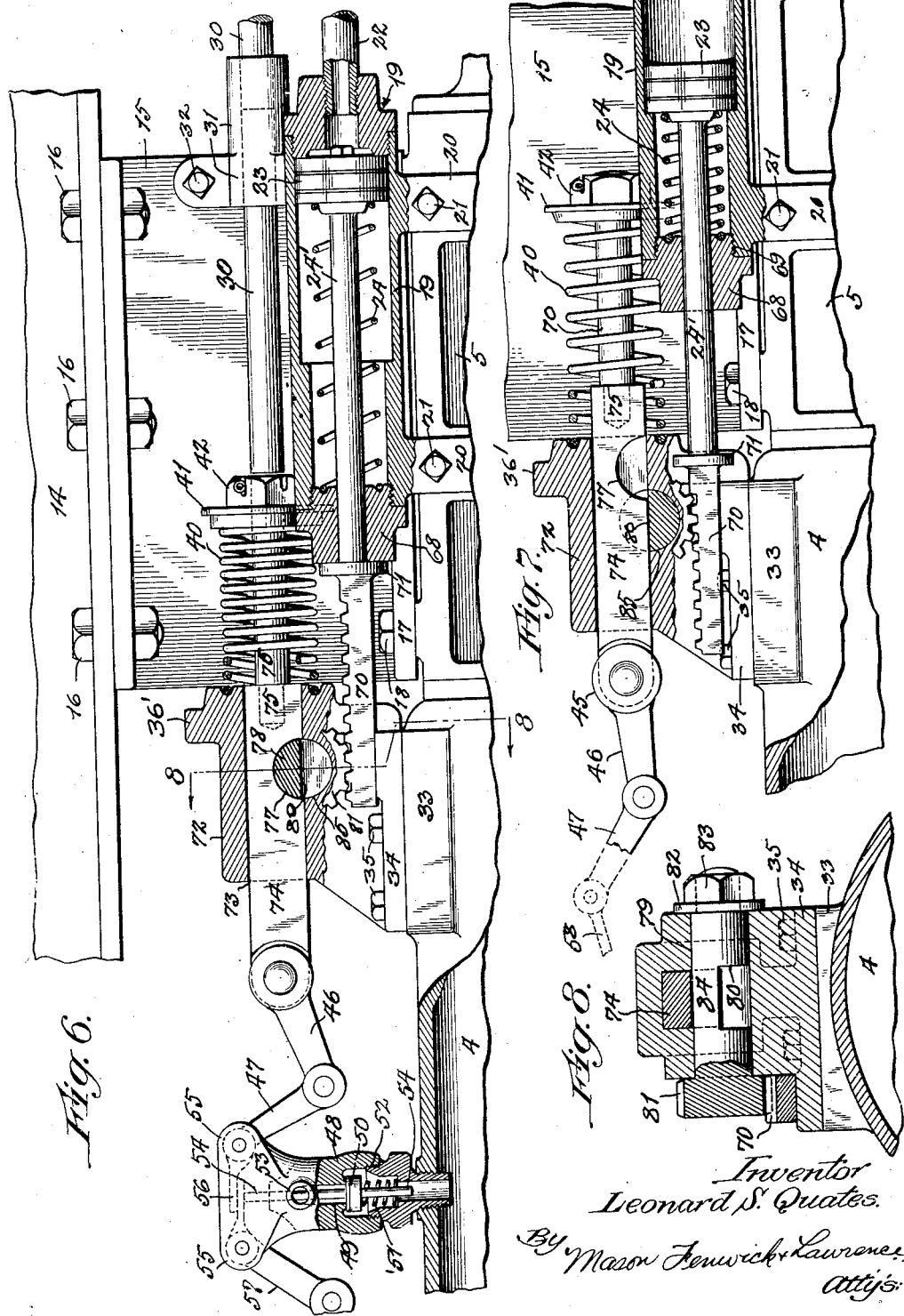
Inventor
Leonard S. Quates.
By Mason Fenwick + Lawrence
Attys.

Patented June 5, 1928.

1,672,731

UNITED STATES PATENT OFFICE.

LEONARD S. QUATES, OF MONTGOMERY, ALABAMA.

AIR-BRAKE SYSTEM AND AUTOMATIC-RELEASING VALVE THEREFOR.

Application filed June 28, 1927. Serial No. 202,087.

This invention relates to air brake systems and to automatic releasing valves and associated mechanism therefor, and more particularly to such valves as are used in connection with the air brake system for railroad cars.

An object of the invention is to provide an improved mechanism over that described in my prior application for automatic releasing valve for air brake systems filed September 19, 1923, Serial No. 663,605, allowed January 24, 1927, and more particularly in the holding and releasing mechanism thereof.

Further object of the invention is to provide a novel automatic releasing valve mechanism for air brake systems on railroad cars which will be positive in operation to release the air brakes should they stick, and which is controlled from the engineer's cab and operated through the air or train line and piping system of the various cars which serves to set the brakes so that the same is under positive control of the engineer at all times, and may be released without requiring the manual release of the brakes by trainmen traveling along the length of a train of cars, and which is so constructed that the brakes may be released positively and instantly from the engineer's cabin or locomotive.

Still further objects of the invention is to provide a relief or release valve which is operated by increasing the pressure, the engineer subjecting the train line pipe to a pressure of 90 pounds or substantially such as distinguished from and above the normal pressure which is usually about 70 pounds so as to actuate the release mechanism and through the triple valve mechanism, to open the release valve for permitting the spring actuated brake cylinder piston to be moved to a released position should the brakes stick by bleeding the air pressure from the brake cylinder, and the reservoir thereof but for a short period only, so as not to materially drain the air brake system below normal pressure such as would subject the brake applying system to unnecessary wear and tear.

Another object of the invention is to provide a brake releasing system which includes a releasing system actuated from the air line which serves to disengage or release a locking or holding device or which constitutes a trip for releasing a valve actuating means, preferably operated by a spring so that the relief valve will be open to drain the auxiliary reservoir and brake piston cylinder, so that the spring acting to release the brakes by exerting pressure on the piston within the cylinder may operate to release the brakes, the auxiliary reservoir being connected with the triple valve in the usual manner of standard construction and all of the mechanism being so constructed and mounted to operate in a simple and efficient manner not likely to get out of working order as well as being thoroughly practical and efficient in operation as well as in manufacture and capable of being readily assembled as well as positive in use.

With the above and other objects in view, the invention consists in certain novel combinations and arrangements of parts to be hereinafter more particularly set forth and described.

In the accompanying drawings:

Figure 1 is a side elevation partly broken away and in section showing one form of automatic releasing device for air brake systems and showing the parts in the position when the brakes are released.

Figure 2 is an enlarged sectional view of the releasing device proper taken on the plane of the section line 2—2 of Figure 3.

Figure 3 is a sectional view taken on the section lines 3—3 of Figures 1 and 2.

Figure 4 is a side elevation showing another form of releasing device.

Figure 5 is a sectional elevation of the device shown in Figure 4, Figure 4 showing the device when the brakes are released and Figure 5 showing the position of the part when the brakes are set.

Figure 6 is an enlarged sectional view partly in elevation of the releasing device proper.

Figure 7 is a view similar to Figure 6 with the releasing valve or relief valve omitted and the parts in a releasing position as distinguished from the holding position shown in Figure 6.

Figure 8 is a section view taken on the line 8—8 of Figure 6.

Referring to the drawings in detail, in which similar reference characters designate corresponding parts throughout the several views, 1 designates the train or air line pipe to which is connected a cross over pipe 2 at one end of the latter, and at the opposite end is connected with the customary triple valve 3 which is mounted on one end of the auxiliary air reservoir 4 with which it communicates interiorly in the usual way and also connects with a brake cylinder 5 mounted on one end of the auxiliary reservoir 4 as indicated at 6, through the medium of an induction pipe or duct 7. The triple valve is of the usual type having the proper channels and ducts leading through the induction pipe 7 into the brake cylinder 5 and is of the quick acting type having the proper slide mechanism incorporated therein as well as having an escape opening or port leading from one side thereof for relieving the pressure therein. Operating in the cylinder 5 is a piston 9, this being the usual brake cylinder piston having the piston rod 10 projecting through its cap or head end 11 and connected by a fork at the point 12 in any suitable manner with the usual brake means not shown. The piston 9 is adapted to slide in the cylinder 5 and is held forward by an expansible coil spring 13 when the piston is relieved of pressure adapted to pass through the induction pipe 7 leading from the triple valve 3 through the remote end of the auxiliary reservoir 4 and into cylinder chamber 5.

All of this structure is supported from the body or framing of the car designated at 14 which may be an I or channel beam by means of a bracket 15 to which it is bolted or otherwise connected as indicated at 16 so as to be suspended vertically therebeneath. The lower end of the bracket 15 has a flange 17 to which the cylinder 5 is bolted and indicated at 18 and arranged thereon is a release cylinder 19 having depending extensions 20 bolted to the cylinder 5 as indicated at 21. A pipe 22 connects the brake line or air pipe 1 with one end of the cylinder 19 in which a piston 23 is adapted to slide against the action of a spring 24 tending to hold it normally outward at the remote end of the cylinder 19 from that to which the pipe 22 is connected and the piston rod 24' of the piston 23 extends inwardly and has pivotally mounted thereon, a trip or obtuse angled bell crank 25 for a purpose to be hereinafter explained. Connected to the piston rod 10 is an angular arm 26 which is clamped to the end of the piston rod 10 to which the forked end 12 is coupled by a pin as indicated at 27 by a clamp 28 and bolted as indicated at 29, the arm 26 extending upwardly and then forwardly as indicated at 30 through a tubular slide or guide member 31 which is in the form of a bracket having oppositely extended apertured ears bolted to the bracket 15 as indicated at 32 so that the forward end thereof is positioned over the cylinder 19 in position to engage the actuating mechanism now to be described.

Mounted upon the auxiliary reservoir 4 by a suitable boss 33 formed thereon is an angular bracket 34 bolted as indicated at 35 and having the upstanding part 36 thereof formed with a forward projection 37 and with a guide sleeve 38 adapted to receive a rod 39 of square or other polygonal cross-section around which a spring 40 is positioned between one end of the guide sleeve 38 and a washer or other enlargement 41 mounted on the opposite end of the rod 39 and held as by means of a lock nut 42 so as to permit attachment and detachment with convenience. An oil groove or opening 43 is provided in the top of the sleeve 38 to lubricate the rod 39 and the rod is further provided with a recess 44 in its top edge and has its free end pivotally connected as at 45 to a forked or bifurcated apertured end 46 providing ears for this purpose and constituting a toggle joint in connection with a link 47 for a relief valve 48 mounted on the top of the auxiliary reservoir 4 and communicating interiorly therewith. The relief valve may have the usual threaded stem inserted in a threaded aperture, and has a seat 49 reservoir for this purpose, and has a seat 49 internally against which a valve 50 engages under the action of a coil spring 51, the valve being preferably composed of two sections with reference to its casing threadedly connected as indicated at 52 to facilitate assemblage, repair or adjustment of the parts. The valve 48 is also provided with a bleed duct or port 53 in one side and the stem 54 of the valve projects upwardly between opposite pairs of spaced ears or bifurcations 55 so as to be engaged by the flat inner ends 56 of the angular link 47 as more particularly shown in Figure 6 of the drawings and the latter adapted to fit over the corresponding end of a link 57 also pivoted to the valve 48 between the ears 55 at the opposite side with respect to the pivoting of the link 47 and connected to a suitable operating rod 58. Pivoted on the upright portion 36 of the bracket 34 by means of an extension 59 thereof as indicated at 60, is a catch or drop latch 61 having an extension 62 adapted to engage in the notch or groove 44 in the rod 39, and the free end of the latter has an angular forward extension or detent 63 projecting down in position to engage any one of a series, preferably 4 arms on a toothed or star wheel 64 which is pivoted or rotatably mounted on the edge of the upright portion 36 of the bracket 34 as indicated at 65. The ends of the arms or teeth of the star wheel are all beveled in the same direction as indicated at 65' and the dog or bell crank 25 is beveled at its inner end as indicated at 66 and tapered and beveled as indicated at 67 at its upper free end. A coil spring 68 is connected to the projection 37 and the free end of the catch 61 so as to hold the latter downwardly in position to intercept the arms of the star wheel 64 and normally prevent them from passing.

In the operation of the device as described, the train line pipe 1 is normally under about 70 pounds pressure and in order to charge the auxiliary reservoir 4, the engineer charges the train line pipe 1 with such pressure and the triple valve 3 will admit such pressure through the quick acting slide mechanism incorporated therein. This pressure passes through the triple valve into the auxiliary reservoir and in order to utilize this reserve 70 pounds pressure for putting on the brakes, it is necessary for the engineer to reduce his train line pressure to 50 pounds. This induces the triple valve to function in such manner as to admit this 70 pounds through the proper channels and ducts and through the induction pipes 7 into the brake cylinder 5 pushing the piston head 9 and rod 10 against the pressure of the spring 13, forcing the brakes against the wheels in the usual manner. In this position, the arm 26 will also be moved with the piston rod and allow the spring 40 to expand except that it is normally held against the expansion by the detent 63 engaging the star wheel arm in position therebeneath while the dog or bell crank 25 is also held against movement. Of course, the pressure in the train line will enter the pipe 22 and force the piston 23 forwardly against the action of the spring 24, thus moving the piston rod 24 forwardly in the manner shown in Figure 1 of the drawing to hold the device in this position with the spring 40 contracted whereby the valve 50 will remain closed owing to the toggle mechanism relieving the upper end of the stem 54 of the valve 50 from pressure thereon.

In order to release the pressure from behind the brake piston 9 and to release or retract the brakes, and the brake pressure, the engineer subjects the train line pipe 1 to 90 pounds pressure. At this stage the triple valve has such a disposition that it does not admit such pressure into the reservoir 4, but the triple valve is provided with an exhaust port 8 as previously described for releasing this pressure and in case this triple valve mechanism should stick, as it happens sometimes, the elements heretofore described in connection with the releasing piston and valve 48, will function under 90 pounds pressure as shown, passing through the pipe 22 to actuate the piston 23 against the action of the spring 24, to operate the trip or dog 25 and star wheel 64, to release the detent 63 and permit the spring 40 to be released whereby the valve 50 will be unseated, thereby bleeding the air pressure positively from the brake cylinder 5 and the auxiliary reservoir 4, the releasing of the air in the reservoir 4 directly through the valve 50 permitting the triple valve 3 to move to released position when the brake cylinder 5 will be released through the port 8 in the usual manner, it being understood that the engineer subjects the pipe line 1 to 90 pounds pressure for a short period only to accomplish this result. At this time, the triple valve mechanism will have to be put into normal position to act or function in the proper manner for which it is intended. That is to say, at this stage, there would be a communication from the brake cylinder through the induction pipe 7 through the exhaust port of the triple valve and the spring 13 will then act to move the piston 9 forwardly to release the brakes, the angular arm 26 moving with the piston rod to engage the rod or plunger 37 and move the same forwardly against the action of the spring 40 to again reset the tripping mechanism and release the valve 50 by reason of the toggle mechanism formed by the links 46 and 47, whereby further escape of air pressure from the auxiliary reservoir and cylinder will be prevented and the device set in position for another operation. When so moved forwardly, the notch 44 will be in position to be engaged by the catch 61 and the detent 63 will be in position to engage over one of the arms of the star wheel 64 while the dog 25 will be in position to be intercepted by the detent 63, thereby restraining the mechanism from further operation until the brakes are reset and released in the same manner as already described.

In the form of the invention shown in Figures 4 to 8 inclusive, the structure is supported from the car frame in the same manner including the bracket 15 for supporting the air reservoir and brake cylinder but in lieu of the tripping mechanism and means for actuating the relief valve 48, by depressing the stem 54 and unseating the valve head 50 as previously described, a modified construction is employed. In this construction the piston rod 24' is projected beyond the cap or plug 68 closing one end of the cylinder 19 and internally threaded therein if desired as indicated at 69 or otherwise secured in position, and is provided with a rack bar 70 beyond an enlargement 71 on the piston rod. The arm or push rod 30 is also provided in the same manner, but in lieu of the bracket 36, a bracket 36' is provided having a guide sleeve 72 with an opening 73 or rectangular or other polygonal cross section therein receiving a rod 74 of corresponding cross section which is coupled as indicated at 75 to a rod 76 on which the spring 40 is mounted in the same manner as heretofore described against one end of the bracket 36' and an enlargement or washer 41 retained by a lock nut 42 at the opposite end adjacent the extremity of push rod 30. The rectangular end 74 of the rod 76 has a semi-circular bottom recess 77 and the opposite end is pivotally connected to the toggle member operating the valve stem 50 in the same manner as previously described beyond the end of the sleeve or guide member 72. A pin 78 is pivoted transversely through an aperture 79 in the bracket 36' and sleeve 72 so as to intercept the recess 77 at times and has a central portion of a length slightly greater than the width of rod 74 cut out as indicated at 80 through one-half of its diameter and one end is provided with a pinion 81 while the opposite end is retained by a washer 82 and a nut 83 to prevent displacement of the pin or shaft of the pinion which latter is in position to normally mesh with the upwardly facing teeth of the rack bar 70. In one position, the portion 84 of the pin 78 is disposed in the lower portion of the guide 72 so as not to project into the semi-circular recess 77 and permit free sliding movement of the rod 74 and in this position, the spring 40 is allowed to act for the purpose of moving the rod 74 to the right when the brakes are applied by movement of the piston 9 under action of pressure against the spring 13 so as to remove the end of the push rod or arm 30 away from the nut 42 in the same manner as previously described, and as shown in connection with the present form in Figure 7 of the drawing. However, when the brakes are released the piston 23 is moved forwardly from the position shown in Figure 7 to the position shown in Figure 6, when the rod 74 will be shifted to permit the valve 50 to seat. The push rod or arm 30 moving forwardly to compress the spring 40 and permitting the part 84 of the pin of the locking and releasing device to move into the recess 77 and thus hold said parts against movement. Of course, the tripping mechanism is actuated upon the piston 23 being moved by the pressure in the release cylinder 19 admitted therethrough through the extension or second cross-over pipe 22 from the main airline or train pipe 1 which moves the portion 84 of the pin into the recess 85 in the guide 72. At the same time, the spring 13 will act to move the push rod or arm 30 against the nut 42 or adjacent thereto and the operation as regards the changes in pressure is the same as previously described.

It will thus be seen that this mechanism will be placed on every car and by its automatic operation, will eliminate the old method of having a brake and a man to release the brakes on each car and inspect each car to see that the brakes are set or released.

While I have described and shown my invention in what I consider to be the preferred form, it is to be understood that various changes in the form, arrangement and construction of the parts may be resorted to without departing from the spirit and scope of the invention and the principles involved in its construction and method of operation and that I reserve the right to make such changes as shall fall within the scope of the device as claimed.

I claim:

1. In an automatic releasing valve for air brake systems, and auxiliary reservoir, a cylinder, a cross-over pipe connected therewith, a triple valve connected with said pipe, a piston slidable in said cylinder and adapted for connection with a brake beam, an extension pipe connected with said reservoir through said triple valve, a release valve mounted on the reservoir, said valve being normally seated, and air actuated means for opening said valve when the brake beam is set, and to release said valve when the brake beam is released.

2. In an automatic releasing valve for air brake systems, an auxiliary reservoir, a cylinder, a cross-over pipe connected therewith, a triple valve connected with said pipe, a piston slidable in said cylinder and adapted for connection with a brake beam, another cross-over pipe connected with said reservoir through said triple valve, a release valve mounted on the reservoir, said valve being normally seated, tripping mechanism connected with said relief valve for permitting the same to remain in a seated postion, and releasing means actuated by air pressure from the main line of the braking system for releasing said tripping mechanism and relief valve.

3. An automatic releasing valve for air brake systems comprising an auxiliary reservoir, a cylinder, a cross-over pipe connected with the air line of the system, a triple valve connected with said pipe, said triple valve having communication with the cylinder through the reservoir, a piston slidable in said cylinder and adapted for connection with a brake beam, an extension pipe connected with the air line, a cylinder connected with said extension pipe, a piston operating in said cylinder, a relief valve on the reservoir, a rod slidably guided and connected to open said relief valve and in one position to permit the same to be seated in another position, means cooperating between said rod and the piston rod of the last named piston to hold said rod against movement when the relief valve is open and actuated by pressure from the air line through the extension pipe and movement of the piston in the cylinder to which the extension pipe leads for releasing the same whereby the relief valve may be opened.

4. An automatic releasing valve for air brake systems comprising an auxiliary reservoir, a cylinder, a cross-over pipe connected with the air line of the system, a triple valve connected with said pipe, said triple valve having communication with the cylinder through the reservoir, a piston slidable in said cylinder and adapted for connection with a brake beam, an extension pipe connected with the air line, a cylinder connected with said extension pipe, a piston operating in said cylinder, a relief valve on the reservoir, a rod slidably guided and connected to open said relief valve and in one position to permit the same to be seated, means cooperating between said rod and the piston rod of the last named piston to hold said rod against movement when the relief valve is open and actuated by pressure from the air line through the extension pipe and movement of the piston in the cylinder to which the extension pipe leads for releasing the same whereby the relief valve may be opened, and a spring for actuating said rod, the piston in the first named cylinder having a push rod adapted to engage said trip rod for compressing the spring when the device is set.

5. An automatic releasing valve for air brake systems comprising an auxiliary reservoir and cylinder, a cross-over pipe connected therewith, a triple valve connected with said pipe, a piston operable in said cylinder and adapted for connection with a brake beam, an extension pipe connected to the air line of the system, a cylinder communicating with said pipe and having a piston operating therein with its piston rod projecting forwardly from one end of the cylinder, a relief valve on the auxiliary reservoir, a guide mounted over the reservoir, a rod slidable in said guide and having a toggle connection with the relief valve, a spring holding said rod projected in one position and adapted to be compressed for holding the rod in a releasing position, means for holding said rod in the last named position, and releasing means for said holding means actuated by the piston rod of the cylinder to which the extension pipe connects whereby said spring may be expanded for unseating the relief valve for releasing the brakes when the brake beam is set and to close said valve when the brake beam is released.

6. An automatic releasing valve for air brake system comprising an auxiliary reservoir and cylinder, a cross-over pipe, connected therewith a triple valve connected with said pipe, a piston operable in said cylinder and adapted for connection with a brake beam, an extension pipe connected to the air line of the system, a cylinder communicating with said pipe and having a piston operating therein with its piston rod projecting forwardly from one end of the cylinder, a relief valve on the auxiliary reservoir, a guide mounted over the reservoir, a rod slidable in said guide and having a toggle connection with the relief valve, a spring holding said rod projected in one position and adapted to be compressed for holding the rod in a releasing position, means for holding said rod in the last named position, and releasing means for said holding means actuated by the piston rod of the cylinder to which the extension pipe connects whereby said spring may be expanded for unseating the relief valve for releasing the brakes when the brake beam is set and to close said valve when the brake beam is released and a push rod connected with the brake beam piston rod and movable therewith adjacent the spring actuated rod to compress the spring thereof when the relief valve is released to seat.

7. An automatic releasing valve for air brake systems comprising an auxiliary reservoir and cylinder, a cross-over pipe connected therewith, a triple valve connected with said pipe, a piston operable in said cylinder and adapted for connection with a brake beam, an extension pipe connected to the air line of the system, a cylinder communicating with said pipe and having a piston operating therein with its piston rod projecting forwardly from one end of the cylinder, a relief valve on the auxiliary reservoir, a guide mounted over the reservoir, a rod slidable in said guide and having a toggle connection with the relief valve, a spring holding said rod projected in one position and adapted to be compressed for holding the rod in a releasing position, means for holding said rod in the last named position, and releasing means for said holding means actuated by the piston rod of the cylinder to which the extension pipe connects whereby said spring may be expanded to unseat the relief valve for releasing the brakes when the brake beam is set and to close said valve when the brake beam is released, and a push rod connected with the brake beam piston rod and movable therewith adjacent the spring actuated rod to compress the spring thereof when the relief valve is released to seat, the releasing piston being moved to set the trip by a spring housed in the cylinder thereof.

8. An automatic releasing valve for air brake systems comprising an auxiliary reservoir and cylinder, a cross-over pipe, connected therewith a triple valve connected with said pipe, a piston operable in said cylinder, a brake beam connected with said piston, an extension pipe connected to the air line of the system, a cylinder communicating with said pipe and having a piston operating therein with its piston rod projecting forwardly from one end of the cylinder, a relief valve on the auxiliary reservoir, a guide mounted over the reservoir, a rod slidable in said guide and having a toggle connection with the relief valve, a spring holding said rod projected in one position and adapted to be compressed for holding the rod in a releasing position, means for holding said rod in the last named position, and releasing means for said holding means actuated by the piston rod of the cylinder to which the extension pipe connects whereby said spring may be expanded for unseating the relief valve for releasing the brakes when the brake beam is set and to close said valve when the brake beam is released and a push rod connected with the brake beam piston rod and movable therewith adjacent the spring actuated rod to compress the spring thereof when the relief valve is released to seat, the releasing piston being moved in one direction under spring action and the tripping mechanism including a toothed wheel, a detent and a spring actuated catch adapted to engage and hold the same in one position and to release same in another position.

9. In an air brake system the combination of an auxiliary reservoir, a brake cylinder, a train pipe and triple valve, there being a duct connecting the triple valve with a brake cylinder and the brake cylinder with the train pipe through said valve, said brake cylinder having its piston set in an unbraked position under spring pressure; of a relief valve associated with the auxiliary reservoir, a cross-over pipe connecting the train pipe with the triple valve, a push rod movable with the brake cylinder piston, spring actuated tripping mechanism connected to actuate the relief valve and adapted to be engaged by the push rod for setting the same, and another cross-over pipe connected with the train line for releasing the tripping mechanism under air pressure.

10. In an air brake system the combination of an auxiliary reservoir, a brake cylinder, a train pipe and a triple valve, there being a duct connecting the triple valve with a brake cylinder and the brake cylinder with the train pipe through said valve, said brake cylinder having its piston set in an unbraked position under spring pressure; of a relief valve associated with the auxiliary reservoir, a cross-over pipe connecting the train pipe with the triple valve, a push rod movable with the brake cylinder piston, spring actuated tripping mechanism connected to actuate the relief valve and adapted to be engaged by the push rod for setting the same, another cross-over pipe connected to the train line pipe, a release cylinder, a piston operating therein and having its rod projecting therefrom, means carried by the rod for engaging the tripping mechanism and releasing the same to permit the actuating means of the relief valve to unseat the same, said device being actuated upon the pressure in the train line being reduced below that for applying the brakes through operation of the brakes, cylinder piston and triple valve in association with the auxiliary reservoir pressure, and then momentarily increasing said pressure while the triple valve is closed against the admission of increased pressure and the brake cylinder or auxiliary reservoir to open said relief valve to relieve the air pressure from or in the auxiliary reservoir to permit operation of the triple valve and release the brake cylinder piston therethrough.

11. In an air brake system the combination of an auxiliary reservoir, a brake cylinder, a train pipe and triple valve, there being a duct connecting the triple valve with a brake cylinder and the brake cylinder with the train pipe through said valve, said brake cylinder having its piston set in an unbraked position under spring pressure; of a release valve associated with the auxiliary reservior, a cross-over pipe connecting the train pipe with the triple valve, a push rod movable with the brake cylinder piston, spring actuated tripping mechanism connected to actuate the release valve and adapted to be engaged by the push rod for setting the same, another cross-over pipe connected to the train line pipe, a release cylinder, a piston operating therein and having its rod projecting therefrom, means carried by the rod for engaging the tripping mechanism and releasing the same to permit the actuating means of the release valve to unseat the same.

In testimony whereof I affix my signature.

LEONARD S. QUATES.